United States Patent [19]
Fischer et al.

[11] Patent Number: 4,945,948
[45] Date of Patent: Aug. 7, 1990

[54] SIGHT FLOW INDICATOR

[75] Inventors: Michael A. Fischer, Kingston; Roger S. Wilkins, Warwick, both of R.I.

[73] Assignee: Grinnell Corporation, Exeter, N.H.

[21] Appl. No.: 433,490

[22] Filed: Nov. 7, 1989

[51] Int. Cl.$^5$ .................. G01F 15/00; F16K 37/00
[52] U.S. Cl. .................. 137/559; 116/274; 116/276
[58] Field of Search .............. 137/551, 559; 116/264, 116/273, 274, 276

[56] References Cited

U.S. PATENT DOCUMENTS

| | | | |
|---|---|---|---|
| 1,179,441 | 4/1916 | Lewis | 116/276 |
| 2,520,869 | 9/1948 | Windsor | 116/273 |
| 2,549,276 | 4/1951 | Wolfe | 116/274 |
| 2,678,624 | 5/1954 | Grise et al. | 116/273 |
| 2,847,969 | 7/1956 | Woodruff | 116/273 |
| 2,970,561 | 2/1961 | Ashwood | 116/273 |
| 3,015,300 | 1/1962 | Tarbox | 116/274 |
| 3,323,484 | 6/1967 | Minkin et al. | 137/551 X |
| 4,474,209 | 10/1984 | Akhtarekhavari | 137/559 |
| 4,819,577 | 4/1989 | Campau | 116/264 |

FOREIGN PATENT DOCUMENTS

| | | | |
|---|---|---|---|
| 536623 | 5/1941 | United Kingdom | 116/273 |
| 947029 | 1/1964 | United Kingdom | 116/274 |

*Primary Examiner*—John Rivell
*Attorney, Agent, or Firm*—Fish & Richardson

[57] ABSTRACT

A sight flow indicator for visually indicating fluid flow through a conduit including a housing that has an inlet and an outlet and defines a flow passage between the two, the flow passage including a sighting region and a downstream restricted region that has a smaller flow area than said sighting region, a window in the housing providing viewing of the sighting region, and an elongated member that is located in the sighting region that is too long to move from the sighting region into the restricted region and is sufficiently smaller than the sighting region so as to be capable of vibrating about in the sighting region in response to flow of fluid therethrough.

11 Claims, 1 Drawing Sheet

SIGHT FLOW INDICATOR

BACKGROUND OF THE INVENTION

The invention relates to sight flow indicators used to visually indicate flow through a conduit.

Sight flow indicators are often connected to a conduit to provide a convenient way of ascertaining whether a fluid is flowing through the conduit, for example, to see if fluid is flowing through an automatic sprinkler system conduit during testing of a fire protection system.

Lewis U.S. Pat. No. 1,179,441 discloses a sight flow indicator that has an inlet and outlet for connection to a pipe and employs two windows located on opposite ends of a sighting region of a flow passage of the indicator to permit viewing of bubbles or particles passing through the passage during flow through it. When turbid water was in the passage of such an indicator in use, a flash light would sometimes be used to assist in viewing flow.

Other sight flow indicators are described in Woodruff U.S. Pat. No. 2,847,969, which shows a flow indicator device consisting of a bladed element (FIG. 1) or three multicolor balls (FIG. 3); Windsor U.S. Pat. No. 2,520,869, which shows a piston that is displaced to indicate a flow condition; and Akhtarekhavari U.S. Pat. No. 4,474,209, which shows an impeller that is rotated within a glass cylinder by fluid flow.

SUMMARY OF THE INVENTION

It has been discovered that an improved sight flow indicator could be provided by placing an elongated member in a sighting region of a flow passage of the indicator. The elongated member is too long to move from the sighting region into a restricted region downstream of the indicator and is sufficiently smaller than the sighting region and supported so as to be capable of vibrating about in the sighting region in response to flow of fluid therethrough. The elongated member desirably provides an indication of fluid flow when fluid conditions such as transparency, turbidity, lack of entrained particles or bubbles, etc., may make such observations difficult or impossible.

In preferred embodiments, an end of the elongated member is adjacent to a window in the sighting region and tends to sweep across the window and prevent accumulation of material that would otherwise impair viewing through the window. There are normally two windows, and they are located adjacent and outboard of the ends of the elongated member. The elongated member is placed across the flow path (most preferably perpendicular to the direction of flow). The member is made of plastic material (most preferably nylon). The elongated member has a circular cross section and has a diameter that is less than $\frac{5}{8}$ (most preferably between $\frac{1}{8}$ and $\frac{3}{8}$) of the flow diameter of the downstream restricted region and that is less than $\frac{7}{8}$, (most preferably between $\frac{1}{4}$ and $\frac{3}{4}$) of the internal diameter of the sighting region around the ends of the elongated member. The elongated member has a simple shape that provides a minimum of resistance to flow through the passage and, owing to its natural fluid dynamic instability, remains in a vibrating type motion under flow conditions.

Other advantages and features of the invention will be apparent from the following description of a preferred embodiment thereof and from the claims.

DESCRIPTION OF THE PREFERRED EMBODIMENT

STRUCTURE

Figure 2:
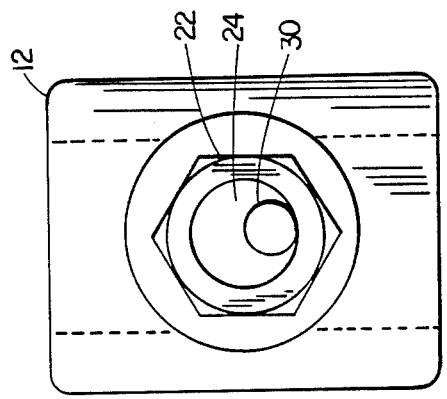
FIG. 2 is a side elevation of the FIG. 1 indicator.
Figure 1:
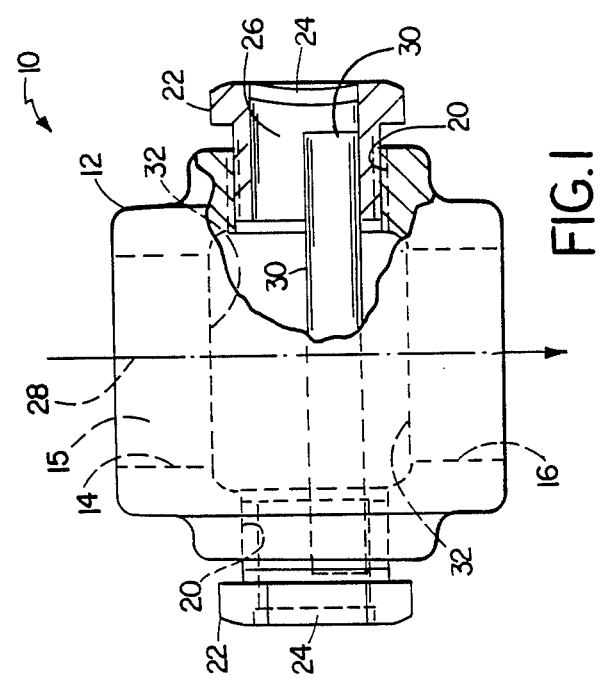
FIG. 1 is a front elevation of a sight flow indicator according to the invention.

Referring to FIGS. 1 and 2, housing 12 of sight flow indicator 10 has threaded inlet 14, threaded outlet 16, and flow passage 15 between the two. Housing 12 has a cross configuration with transverse threaded openings 20 that receive threaded sight glass nuts 22. Threaded sight glass nuts 22 employ glass windows 24 to permit viewing of sighting region 26 between them. The axis of threaded openings 20 is perpendicular to flow axis 28 from inlet 14 to outlet 16. Elongated member 30 is located in sighting region 26 and has its ends within nuts 22.

Inlet 14 and outlet 16 are threaded to receive 1¼" threaded pipe. Just inward of the threads of inlet 14 and outlet 16 the diameter of flow passage 15 is 1.66" at restricted regions 32 between inlet 14 and sighting region 26 and between sighting region 26 and outlet 16. Nuts 22 have a 0.94" inner diameter. Elongated member 30 is a circular cross section nylon rod that is 3.62" long and has a diameter of 0.44". Nuts 22 are threaded into their respective threaded openings so that the ends of elongated member 30 are in close proximity to windows 24, e.g., until there is about $\frac{1}{8}$" total spacing on both sides. Flow passage 15 increases at the transitions between the restricted regions 32 and the transverse threaded openings 20. Flow passage 15 is thus larger in sighting region 26 than it is in restricted regions 32 such that the presence of the elongated member 30 has no significant effect on the pressure loss due to flow through the housing 12.

OPERATION

In operation, indicator 10 is threaded to a conduit, for example, a valve that is located in the drain line of a fire protection sprinkler system and which is used during testing of the system. When fluid flows through flow passage 15, elongated member 30 is caused to vibrate, providing an easily discernible visual indication to a viewer looking through a window 24. Elongated member 30 is too long to move from sighting region 26 into the restricted region 32 downstream of the elongated member 30 and is sufficiently smaller than sighting region 26 and supported so as to be capable of vibrating about in sighting region 26 in response to the flow of fluid therethrough. The vibratory movement of the ends of elongated member 30 in the vicinity of windows 24 also acts to wipe the inside surfaces of the windows 24 and helps prevent the accumulation of materials thereon.

Improved visual indication is thus provided by a simple mechanism without substantial hindrance to the flow of fluid through it as the flow area increases at sighting region 26 to make up for flow area blocked by elongated member 30. Indicator 10 would typically be employed with flow axis 28 in a vertical orientation but would also work in a horizontal orientation or at an angle with the horizontal.

OTHER EMBODIMENTS

Other embodiments of the invention are within the scope of the following claims. For example, other shapes and sizes could be employed for the elongated member. Materials other than nylon could be employed for the elongated member. Other means of support of the elongated member in the fluid path and within the sighting region may be used. These support means may include, but are not limited to, having an elongated member with tubular ends bearing on a pin sufficiently smaller in outside diameter with respect to the inside diameter of the recess in each end of the elongated member or suspending the elongated member (i.e., hanging), such that it is capable of moving in the sighting region in response to fluid flow.

The ends of the elongated member adjacent to the view windows may be contrastingly colored or specifically shaped to enhance the visual indication of movement to a viewer looking through a sighting window. The relationship between the physical geometry of the elongated member, the size of the sighting region, the size of the upstream restricted region, and the size of the downstream restricted region may be varied to provide for the desired vibratory movement of the elongated member over a wide range of fluid densities, viscosities, and compressibilities without unduly hindering flow. The degree of vibratory movement of the elongated member can also be further modified by controlling the turbulence of the flow upstream of the inlet of the sight flow indicator.

What is claimed is:

1. A sight flow indicator for visually indicating fluid flow through a conduit comprising a housing that has an inlet and an outlet and defines a flow passage between the two, said flow passage including a sighting region and a restricted region that is between said sighting region and said outlet and has a smaller flow area than said sighting region, a window in said housing providing viewing of said sighting region, and an elongated member that is located in said sighting region and is too long to move from said sighting region into said restricted region and is sufficiently smaller than said sighting region so as to be capable of vibrating about in said sighting region in response to flow of fluid therethrough, and wherein said elongated member is disposed in said sighting region such that its longitudinal axis is essentially perpendicular to the direction of flow from said inlet to said outlet.

2. The indicator of claim 1 wherein an end of said elongated member is adjacent to said window.

3. The indicator of claim 2 wherein there are two said windows adjacent to and outboard of the opposite ends of said elongated member.

4. The indicator of claim 1 wherein said elongated member is made of a plastic material.

5. The indicator of claim 1 wherein said elongated member has an external circular cross section.

6. The indicator of claim 5 wherein said housing has an internal circular cross section about the ends of said elongated member.

7. The indicator of claim 5 wherein said restricted region has a circular flow area.

8. A sight flow indicator for visually indicating fluid flow through a conduit comprising a housing that has an inlet and an outlet and defines a flow passage between the two, said flow passage including a sighting region and a restricted region that is between said sighting region and said outlet and has a smaller flow area than said sighting region, a window in said housing providing viewing of said sighting region, and an elongated member that is located in said sighting region and is too long to move from said sighting region into said restricted region and is sufficiently smaller than said sighting region so as to be capable of vibrating about in said sighting region in response to flow of fluid therethrough, wherein said elongated member has an external circular cross section, wherein said housing has an internal circular cross section about the ends of said elongated member, and wherein said elongated member has a diameter that is less than ⅞ of the internal diameter of said housing about the ends of the elongated member.

9. The indicator of claim 8 wherein said elongated member has a diameter that is between ¼ and ¾ of the internal diameter of said housing about the ends of the elongated member.

10. A sight flow indicator for visually indicating fluid flow through a conduit comprising a housing that has an inlet and an outlet and defines a flow passage between the two, said flow passage including a sighting region and a restricted region that is between said sighting region and said outlet and has a smaller flow area than said sighting region, a window in said housing providing viewing of said sighting region, and an elongated member that is located in said sighting region and is too long to move from said sighting region into said restricted region and is sufficiently smaller than said sighting region so as to be capable of vibrating about in said sighting region in response to flow of fluid therethrough, wherein said elongated member has an external circular cross section, wherein said restricted region has a circular flow area, and wherein said elongated member has a diameter that is less than ⅞ of the diameter of said restricted region.

11. The indicator of claim 10 wherein said elongated member has a diameter that is between ⅛ and ⅞ of the diameter of said restricted region.

* * * * *